W. W. KRUTSCH.
VEHICLE WHEEL.
APPLICATION FILED APR. 25, 1912.
1,037,931. Patented Sept. 10, 1912.
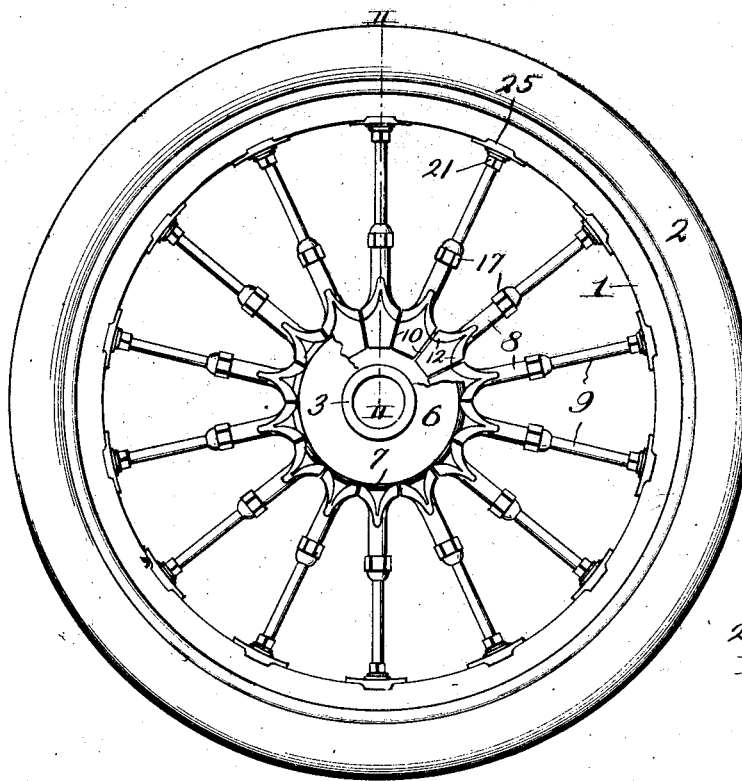
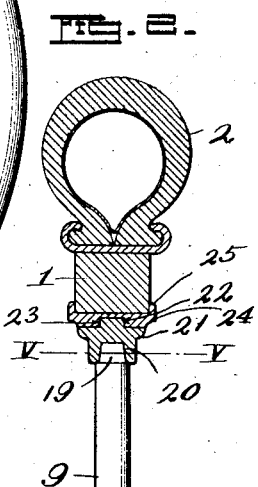
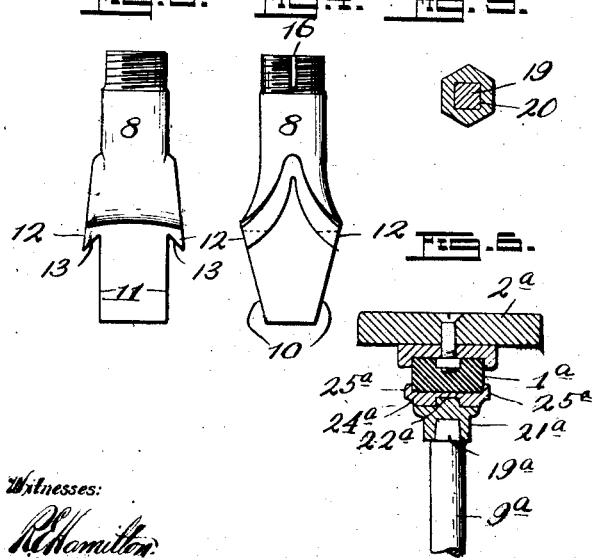
Witnesses:
R. Hamilton
E. C. Lillian
Inventor,
Willis W. Krutsch,
By F. G. Fischer,
Atty.

UNITED STATES PATENT OFFICE.

WILLIS W. KRUTSCH, OF COFFEYVILLE, KANSAS, ASSIGNOR OF ONE-FOURTH TO CALEB O. ROSS AND ONE-FOURTH TO MICHAEL B. SHUFFLIN, BOTH OF COFFEYVILLE, KANSAS.

VEHICLE-WHEEL.

1,037,931.  Specification of Letters Patent.  Patented Sept. 10, 1912.

Application filed April 25, 1912. Serial No. 693,212.

*To all whom it may concern:*

Be it known that I, WILLIS W. KRUTSCH, a citizen of the United States, residing at Coffeyville, in the county of Montgomery and State of Kansas, have invented certain new and useful Improvements in Vehicle-Wheels, of which the following is a specification.

My invention relates to improvements in vehicle wheels, and my objects are to provide a novel wheel of this character which can be readily put together or taken apart, and one wherein the spokes can be readily tightened should they become loose, or easily replaced should they become broken.

Other objects of the invention will hereinafter appear, and in order that said invention may be fully understood reference will now be made to the accompanying drawings, in which:

Figure 1 is a side elevation partly broken away of my improved vehicle wheel. Fig. 2 is an enlarged vertical section on line II—II of Fig. 1. Fig. 3 is an elevation of a sleeve forming one of the important features of the invention. Fig. 4 is an elevation of said sleeve turned at right angles to Fig. 3. Fig. 5 is a horizontal section on line V—V of Fig. 2, and Fig. 6 is a broken vertical section of a modified form of the invention.

In the present instance I have shown my invention in the form of an automobile wheel, although I do not limit myself to this particular type of wheel, as the invention may be made in the form of an artillery wheel, wagon-wheel, or any other desirable type.

Referring in detail to the preferred form disclosed by said drawing, 1 designates a rim which is embraced by a pneumatic tire 2.

3 designates the hub of the wheel which is provided between its ends with a peripheral flange 4 having a beveled periphery 5, for a purpose which will hereinafter appear.

6 designates an annulus removably-mounted upon the hub 3 and of the same diameter as flange 4, and like said flange has a beveled periphery 7. Annulus 6 is spaced a suitable distance from flange 4 to receive a plurality of sleeves 8 adapted to secure the inner ends of the spokes 9 in place, as clearly shown on Fig. 2.

Sleeves 8 are tapered at their adjacent sides 10 to describe the circle about the hub 3 and their two parallel sides 11, arranged at right angles to the tapered sides 10, having downwardly-extending shoulders 12 beveled at their undersides 13 to snugly embrace the beveled peripheries 5 and 7 of flange 4 and annulus 6, respectively. By thus engaging the beveled peripheries 5 and 7 with the beveled shoulders 13, sleeves 8 are held from lateral movement by the flange 4 and in turn hold the annulus 6 from lateral movement, so that the same need not be bolted or otherwise secured to hub 3 or flange 4.

The interior of each sleeve 8 is larger in diameter than its respective spoke to freely receive said spoke, but has an internal integral nut 14 to receive the threaded inner end 15 of the spoke.

Threaded portion 15 of the spoke is prevented from working loose from the nut 14 by the threaded, split, outer terminal 16 of sleeve 8, said split terminal 16 being forced into frictional engagement with the spoke by a cap-nut 17, which screws upon the split terminal 16 and causes the same to grip the spoke.

The split terminal 16 and the cap-nut 17 are assisted in holding the spoke from turning by metal packing 18 interposed between the two, as shown on Fig. 2.

The outer end of each spoke 9 terminates in a reduced rectangular stud 19, which enters a corresponding recess 20 in a rectangular member 21 having a centrally-disposed circular stud 22, fitting into a corresponding recess 23, centrally located in a clip 24, fitting against the inner periphery of the rim 1 and provided with two marginal flanges 25 engaging opposite sides of said rim.

Should a spoke for any reason become loose, it can be readily tightened by grasping its respective rectangular member 21 with a wrench and turning the same to screw the spoke down into the nut 14 of its respective sleeve 8.

Should a spoke become bent and have to be replaced by a new one, it can be easily removed by loosening cap-nut 17 and screwing the sleeve 8 up on the spoke until shoulders 12 are carried far enough above the peripheries of flange 4 and the annulus 6 to permit the spoke and said sleeve to move toward the hub until clip 25 disengages the rim.

In the modified form disclosed by Fig. 6, the construction is substantially the same as in the preferred form, except that the pneumatic tire 2 is replaced by a metallic tire 2ª, and the rigid rim 1 is replaced by a rubber of other resilient rim 1ª. Referring in detail to said modified form 9ª designates a spoke having a rectangular outer terminal 19ª fitting into the corresponding recess of a rectangular member 21ª, provided with a circular stud 22ª, engaging a corresponding recess in a clip 24ª, having two marginal flanges 25ª engaging opposite sides of the rim 1ª.

Having thus described my invention what I claim and desire to secure by Letters Patent, is:

1. In a vehicle-wheel, a rim, spokes operably and removably connected at their outer ends to said rim and threaded at their inner ends, a centrally-disposed hub having a peripheral flange provided with a beveled periphery, an annulus removably-mounted upon said hub and spaced a short distance from the flange, said annulus having a beveled periphery, and sleeves adjustably-engaging the threaded inner ends of the spokes, said sleeves having shoulders engaging the beveled peripheries of the flange and the annulus, substantially as described.

2. In a vehicle wheel, a rim, spokes operably and removably connected at their outer ends to said rim and threaded at their inner ends, a centrally-disposed hub having a peripheral flange provided with a beveled periphery, an annulus removably-mounted upon said hub and spaced a short distance from the flange, said annulus having a beveled periphery, sleeves adjustably-engaging the threaded inner ends of the spokes, said sleeves having split outer ends and shoulders engaging the beveled peripheries of the flange and the annulus, and cap-nuts engaging the split ends of said sleeves to force them into frictional contact with the spokes.

3. In a vehicle wheel, a rim, spokes operably and removably connected at their outer ends to said rim and threaded at their inner ends, a centrally-disposed hub having a peripheral flange provided with a beveled periphery, an annulus removably-mounted upon said hub and spaced a short distance from the flange, said annulus having a beveled periphery, sleeves adjustably-engaging the threaded inner ends of the spokes, said sleeves having split outer ends and shoulders engaging the beveled peripheries of the flange and the annulus, cap-nuts engaging the split ends of said sleeves to force them into frictional contact with the spokes, and packing interposed between said cap-nuts and the split ends of the sleeves.

In testimony whereof I affix my signature, in the presence of two witnesses.

WILLIS W. KRUTSCH.

Witnesses:
 ROSA WARNER,
 E. F. HUFFMAN.